United States Patent Office 3,446,802
Patented May 27, 1969

---

3,446,802
3-HYDROXYMETHYL-1-(5-NITROFURFURYL-IDENEAMINO) HYDANTOIN
Julian Getz Michels, Norwich, N.Y., assignor to The Norwich Pharmacal Company, a corporation of New York
No Drawing. Filed Dec. 27, 1960, Ser. No. 78,329
Int. Cl. C07d 49/32; A61k 27/00
U.S. Cl. 260—240     1 Claim This invention relates to 3-hydroxymethyl-1-(5-nitrofurfurylideneamino) hydantoin which exhibit effective chemotherapeutic activity. More particularly, this invention is concerned with 3-substituted-1-(5-nitrofurfurylideneamino) hydantoin corresponding to the formula:

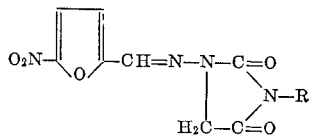

in which R represents hydroxymethyl.

These hydantoins possess features which make them valuable and distinctive chemotherapeutic agents. I have found that these hydantoins which I have invented are effective systemic antibacterial agents when administered in sub-toxic amounts to animals infected with pathogenic microorganisms such as *Salmonella typhosa* and *Staphylococcus aureus*. Administered in a single dose of 210 mg./kg. suspended in carboxymethylcellulose to lethally infected mice, a survival of 50% is obtained. Given in three divided doses of 70 mg./kg. at one-half, four and eight hours post infection, the survival rate is 60%.

I have further discovered that my hydantoins when administered to animals undergo molecular rearrangement and change to form nitrofurantoin. This lability possessed by my hydantoins to produce in situ a notable urinary tract chemotherapeutic agent makes them a valuable alternative form for achieving urinary tract chemotherapeusis. When orally administered to rats, from 23–33% of the ingested dose is excreted in the urine. Such an amount renders the urine antibacterial to organisms, such as *E. coli*, oftentimes encountered and troublesome in urinary tract infections.

My hydantoins are not limited to the oral route of administration. I have found that they are relatively soluble in hydroxylated organic solvents such as the polyethylene glycols, and can be dispensed therein for parenteral administration, e.g., intravenously. An intramuscular dose of about 20 mg./kg. in polyethylene glycol 400 results in the elimination in the urine of from 40–48% thereof as nitrofurantoin.

My hydantoins may be readily compounded and formulated in common pharmaceutical dosage forms as solutions, capsules, tablets, suspensions and the like using excipients and adjuvants known in the art.

The methods which I use to prepare my 3-R-substituted-1-(5-nitrofurfurylideneamino) hydantoins in which R has the significance given above are simple and readily carried out. The introduction of the R group in the hydantoin nucleus may be accomplished by bringing it in contact with reactive compounds capable of supplying the R group. Suitable reactive compounds which are very readily available are formaldehyde.

The method which I currently prefer for preparing my 3-R-substituted-1-(5-nitrofurfurylideneamino) hydantoins in which R has the significance given above consists in reacting nitrofurantoin with formaldehyde under the influence of heat. In this method nitrofurantoin is merely mixed with the appropriate R supplying reactant and the mixture refluxed. The product is filtered and dried.

In order that my invention may be readily available to and understood by those skilled in the art, the following illustrative example is supplied:

EXAMPLE
3-hydroxymethyl-1-(5-nitrofurfurylideneamino) hydantoin

Three liters of 5% formaldehyde solution (2625 cc. water and 375 cc. 40% formalin) containing 50 gm. of nitrofurantoin is refluxed for about 5 minutes, then filtered hot and cooled. The crystallized product is filtered and washed with 1% formaldehyde solution. It is air dried and then further dried at 65°. There is obtained 33 g. of 3-hydroxymethyl-1-(5-nitrofurfurylideneamino) hydantoin which analyzes as follows:
Calc'd: C, 40.30; H, 3.01; N, 20.89. Found: C, 40.31; H, 3.40; N, 21.06.

What I claim is:
1. The compound of the formula:

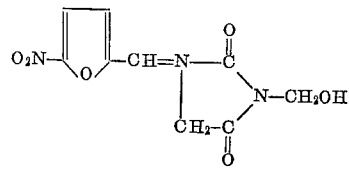

References Cited

UNITED STATES PATENTS

| | | | |
|---|---|---|---|
| 2,610,181 | 9/1952 | Hayes | 260—240 |
| 3,076,805 | 2/1963 | Michels | 260—240 |
| 3,097,202 | 7/1963 | Michels | 260—240 |
| 3,110,713 | 11/1963 | Spencer | 260—240 |

FOREIGN PATENTS

| | | |
|---|---|---|
| 288,373 | 10/1958 | Great Britain. |
| 346,546 | 7/1960 | Switzerland. |
| 360,688 | 10/1922 | Germany. |
| 1,067,822 | 10/1959 | Germany. |

OTHER REFERENCES

Christenson et al., Curr. Ther. Res., vol. 2, pp. 458 to 464 and 471 to 473, September 1960.

Behrend et al., Annalen der Chemie, vol. 365, pp. 38 to 40 (1908).

Chemical Abstracts, vol. 48, columns 3343–4 (1954). [Abstract of Sanchez et al., Anales real soc. espan. fis y. quine, vol. 49B, pp. 51–6 (1953)].

JOHN D. RANDOLPH, *Primary Examiner.*

U.S. Cl. X.R.
424—273

PO-1050
(5/69)

UNITED STATES PATENT OFFICE
CERTIFICATE OF CORRECTION

Patent No. 3,446,802                    Dated May 27, 1969

Inventor(s) JULIAN GETZ MICHELS

It is certified that error appears in the above-identified patent and that said Letters Patent are hereby corrected as shown below:

In column 2, line 30, that portion of the formula reading "-CH=N-" should read -- -CH=N-N- --.

SIGNED AND
SEALED
SEP 30 1969

(SEAL)
Attest:

Edward M. Fletcher, Jr.
Attesting Officer

WILLIAM E. SCHUYLER, JR.
Commissioner of Patents